(12) United States Patent
Cheng et al.

(10) Patent No.: US 7,457,236 B2
(45) Date of Patent: Nov. 25, 2008

(54) METHOD FOR PROVIDING FAULT-TOLERANT APPLICATION CLUSTER SERVICE

(75) Inventors: Fan-Tien Cheng, Tainan (TW); Shung-Lun Wu, Tainan (TW); Ping-Yen Tsai, Kaohsiung (TW)

(73) Assignee: National Cheng Kung University, Tainan (TW)

(*) Notice: Subject to any disclaimer, the term of this patent is extended or adjusted under 35 U.S.C. 154(b) by 592 days.

(21) Appl. No.: 11/106,892

(22) Filed: Apr. 15, 2005

(65) Prior Publication Data

US 2005/0237926 A1    Oct. 27, 2005

(30) Foreign Application Priority Data

Apr. 22, 2004    (TW) .............................. 93111309 A (51) Int. Cl.
G01R 31/08    (2006.01)
(52) U.S. Cl. ..................................... 370/220
(58) Field of Classification Search ......... 370/216–228, 370/242, 236, 254–255, 248–249
See application file for complete search history.

(56) References Cited

U.S. PATENT DOCUMENTS

| | | | |
|---|---|---|---|
| 5,502,812 A | 3/1996 | Leyre et al. | |
| 6,094,416 A * | 7/2000 | Ying | 370/222 |
| 6,212,649 B1 | 4/2001 | Yalowitz et al. | |
| 6,502,203 B2 | 12/2002 | Barron et al. | |
| 6,532,494 B1 * | 3/2003 | Frank et al. | 709/224 |
| 6,633,538 B1 * | 10/2003 | Tanaka et al. | 370/222 |
| 6,636,982 B1 | 10/2003 | Rowlands | |
| 6,856,591 B1 * | 2/2005 | Ma et al. | 370/216 |
| 2002/0049845 A1 * | 4/2002 | Sreenivasan et al. | 709/226 |
| 2003/0149735 A1 * | 8/2003 | Stark et al. | 709/208 |
| 2004/0049573 A1 * | 3/2004 | Olmstead et al. | 709/224 |

* cited by examiner

Primary Examiner—Kwang B. Yao
Assistant Examiner—Candal Elpenord
(74) Attorney, Agent, or Firm—Michael A. Glenn; Glenn Patent Group (57) ABSTRACT

A method for providing an application cluster service (APCS) with fault-detection and failure-recovery capabilities. This method is composed of the steps of nodes clustering, invoking and detecting applications, fault-recovery of applications, detection of nodes, and node replacement. This method is applicable in a clustered environment to detect if a slave node is failed by sending a heartbeat periodically from a master node; and to detect if the master node still exists by checking if the master node stops sending the heartbeat (i.e. the master node may be failed).

10 Claims, 10 Drawing Sheets

METHOD FOR PROVIDING FAULT-TOLERANT APPLICATION CLUSTER SERVICE

RELATED APPLICATIONS

The present application is based on, and claims priority from, Taiwan Application Ser. No. 93111309, filed Apr. 22, 2004, the disclosure of which is hereby incorporated by reference herein in its entirety.

FIELD OF THE INVENTION

The present invention relates to a providing fault-tolerant application cluster service (APCS) scheme, and more particularly, to providing the APCS method with concise processes for detecting node failure and replacing functions of the failed nodes.

BACKGROUND OF THE INVENTION

The cluster service architecture (i.e. Microsoft Cluster Service; MSCS) provided by U.S. Microsoft corporation is directed to a solution for total fault-tolerant management with respect to platform resources, which not only can mange the fault-tolerant capability of application programs but also can manage disk drives, printers and other Microsoft software systems, such as SQL Server 2000 and Exchange Server 2000. When the node detection mechanism of MSCS applied in a relatively complicated cluster, all of the nodes therein will send periodic heartbeats to notify other nodes that "I am alive!", thus resulting in heavier network burden.

With regard to existing patents, U.S. Pat. No. 6,636,982 entitled "Apparatus and method for detecting the reset of a node in a cluster computer system" provides a scheme regarding a process of adding load-balancing cluster nodes to a cluster environment. Among the nodes activated in the original cluster environment, one node acts as a master node (usually the node first activated is the master node). When there is a new node desired to be added to the cluster environment, the master node will determine if the new node is allowed to be added, the determining process thereof including verifying the network connection of the new node is consistent with its configuration, etc. If the new node is permitted to be added, the master node will command the new node to provide service together. This prior patent mainly provides a verification scheme of cluster nodes for ensuring the new nodes in the cluster environment can be added correctly. However, this prior patent fails to provide a heartbeat communication method among the nodes in the updated cluster environment after the new nodes are added in.

U.S. Pat. No. 6,502,203 entitled "Method and apparatus for cluster system operation" provides the concept of using a secondary channel, wherein nodes in a normal cluster environment issue heartbeats via a primary channel. When a node in the cluster is detected to be abnormal, a heartbeat will be sent via the second channel for further validation. If the results are the same for two channels, the lost node detected can then be confirmed to be abnormal. The main purpose of this prior patent is to prevent abnormal cluster operation due to heartbeat loss by using multiple communication channels. However, the method of this prior patent merely resolves the problem superficially but not fundamentally, and does not provide any substantial improvement on the conventional heartbeat communication method which is relatively complicated.

U.S. Pat. No. 5,502,812 entitled "Method and system for automatic fault detection and recovery in a data processing system" adds one or more backup elements for each member in a data-processing system, and uses the signal sent by a watchdog circuit to check if the member in execution is abnormal. If a fault occurs, the tasks undertaken are transferred to the backup elements for continuous execution. The prior patent mainly provides a redundancy mechanism for a single-unit hardware environment. However, the prior patent does not support distributed structures, and merely provides 1:1 backup support, but not 1:N backup support.

U.S. Pat. No. 6,212,649 entitled "System and method for providing highly-reliable coordination of intelligent agents in a distributed computing" discloses an intelligent agent to detect if information transmitted in a distributed system is correct. If a fault occurs, then the sending agent is asked to re-send the information, thereby promoting system reliability. However, if the receiving agent has the errors of such as system down, etc., the receiving agent cannot recover back to normal operation even if the information is re-sent. Further, the distributed object system built by applying the prior patent also lacks of the recovery function for faulty programs. Thus, when the programs in the system have errors, users cannot freely select other normal services in the system to replace the faulty programs.

Hence, there is an urgent need to develop a method for providing fault-tolerant application cluster service, thereby simplifying detection processes and achieving better fault-tolerant efficiency for application programs, further reducing network burden and improving the shortcomings of the conventional skills.

SUMMARY OF THE INVENTION

An object of the present invention is to provide a method for providing fault-tolerant application cluster service, thereby simplifying detection processes and achieving better fault-tolerant efficiency for application programs.

Another object of the present invention is to provide a method for providing fault-tolerant application cluster service, so as to have generic applicability and be suitable for use in various high-tech industries to promote the availability and reliability of a manufacturing execution system (MES).

Still another object of the present invention is to provide a method for providing fault-tolerant application cluster service for reducing network burden by issuing periodic heartbeats merely from one single master node during normal operation.

According to the aforementioned objects, a method for providing fault-tolerant application cluster service is provided for use in a group in a cluster environment, wherein there are a plurality of nodes and a database in the cluster environment, and these nodes belong to the group and can be classified into a master node and a plurality of slave nodes.

According to a preferred embodiment of the present invention, the method for providing fault-tolerant application cluster service comprises: performing a node-clustering step; performing a step of invoking and detecting applications; performing an application fault-recovery step; performing a slave-node detection step; performing a master-node detection step; performing a slave-node replacement step; and performing a master-node replacement step.

The node-clustering step is used for storing node information for each of the nodes into the database, wherein the node information includes a node ID and APCS service data.

The step of invoking and detecting applications is used for activating a first application of a first node of the nodes via a first cluster service of the first node; updating the execution state of the first application as "UP" in the first node and the database after the first application is activated, wherein the first cluster service also monitors the execution status of the first application.

The application fault-recovery step is used for changing the execution state of the first application in the first node and the database to "DOWN", when the first node learns that the first application has execution errors; selecting a second node having a second application, and notifying the second node to invoke the second application, wherein the function of the second application is the same as the function of the first application; and after the second application is activated successfully, changing the execution state of the second application in the second node and the database to "UP", wherein the execution status of the second application is then monitored.

The slave-node detection step includes the following steps. When the first node is activated, the first node retrieves data in the database to determine if there exists the master node in the cluster environment, thereby generating a first result. When the first result is yes, the first node is one of the slave nodes. Thereafter, the first node notifies the master node that the first node is added to the cluster environment. Then, the master node activates a heartbeat mechanism for sending a master heartbeat periodically to each of the slave nodes, and waits for an acknowledgement response from each of the slave nodes. Meanwhile, each of the slave nodes starts a timer for waiting for the heartbeat sent by the master node, and resets its timer after receiving the master heartbeat.

In the master-node detection step, when the sending of the master heartbeat is interrupted due to the master node's errors, each slave node's timer will be stopped ("Timeout") after each slave node has not received the master heartbeat for a period of time, and thus each slave node stops waiting for receiving the master heartbeat. Thereafter, each of the slave nodes starts detecting if the master node is still in normal operation.

In the slave-node replacement step, the master node stops sending the master heartbeat to a first slave node of the slave nodes in the cluster environment after having detected that the first slave node has already had no response, and notifies the database and the rest of the slave nodes except the first node to change the execution state of the first slave node to "Failure". Thereafter, the master node retrieves data from the database to select at least one second slave node having the same application executed in the first node before failure. Then, the master node notifies the second node to invoke its application.

In the master-node replacement step, when one of the slave nodes has detected that the master node has malfunctions, the execution state of the master node in the database is changed to "Failure". Then, other slave nodes in the cluster environment are notified to stop detecting the master node. Thereafter, each of the slave nodes retrieves data in the database to determine if it should be a new master node. Then, the new master node re-activates a new heartbeat mechanism for sending a new master heartbeat to the rest of the slave nodes which are not the new master node, and waits for a new acknowledgement response therefrom. Then, the new master node retrieves data from the database to select at least one third slave node having the same application executed in the master node before failure.

Hence, the present invention can simplify detection processes and achieve better fault-tolerant efficiency for application programs; has generic applicability and is suitable for use in various high-tech industries to promote the availability and reliability of such as a manufacturing execution system (MES); and can reduce network burden by sending heartbeats via one single healthy master node.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The APCS provided by the present invention basically classifies the nodes in a cluster environment into two roles of master node and slave nodes, wherein only one mater node exists in the cluster environment, and the rest of the nodes are slave nodes. In normal operation, the master node sends periodic heartbeats to each of the slave nodes for letting the slave nodes be aware of the existence of the master node, and detecting if the salve nodes have errors and have no response. When the heartbeats stop being sent out for three successive occasions (the master node may have errors at this time), each of the salve nodes starts making an inquiry to detect if the master node is still available. If no response is returned for the inquiry for three successive tries, it can be concluded that the master node is failed. If any of the slave nodes has detected that the master is failed, the rest of the slave nodes will be notified to stop making the inquiry. Thereafter, a new master node will be selected from all the slave nodes.

The entire operation procedure of the application cluster service of the present invention mainly including the following five parts: a node-clustering step, a step of invoking and detecting applications, an application fault-recovery step, a node-detection step and a node replacement step.

The node-clustering step is used for configuring the cluster environment. In the step of invoking and detecting applications, any one of the nodes in the cluster environment may be used to invoke an application of itself or other nodes, and the associated cluster service starts detecting the execution status of the application. In the application fault-recovery step, once the abnormal breakdown of the application occurs, the associated cluster service will look for a healthy node with the backup application, and transfers the failed service to the node found so as to provide continuous services.

In the node-detection step, after users activate the cluster service of some node, this node will become a master node if it is the first node activated in a group of the cluster environment. Thereafter, all the subsequent nodes starting their cluster services are assigned to be slave nodes. Following node assignment, the master node periodically informs all of the slave nodes that "I am alive!" via a heartbeat mechanism, and meanwhile checks whether an acknowledgement response is returned normally from each of the slave nodes. If the breakdown of the master node occurs, the slave nodes will start detecting if the master node is really broken.

In the node replacement step, once the master node has learned that a certain slave node has no response, the rest of the activated slave nodes will be notified to perform a function transfer step for transferring all the services originally provided in the failed slave node to other healthy nodes, thereby providing continuous services. When the master is broken and fails to send out heartbeats, the slave nodes activated will execute a "Reconfigure" instruction to select a new mater node. Then, the new master node selects at least one healthy node (the new master node or other slave nodes), and then transfers all the services originally provided in the failed slave node to the healthy node for providing continuous services.

The detailed process of each aforementioned step is described hereinafter.

(1) Node-Clustering Step

Figure 1:
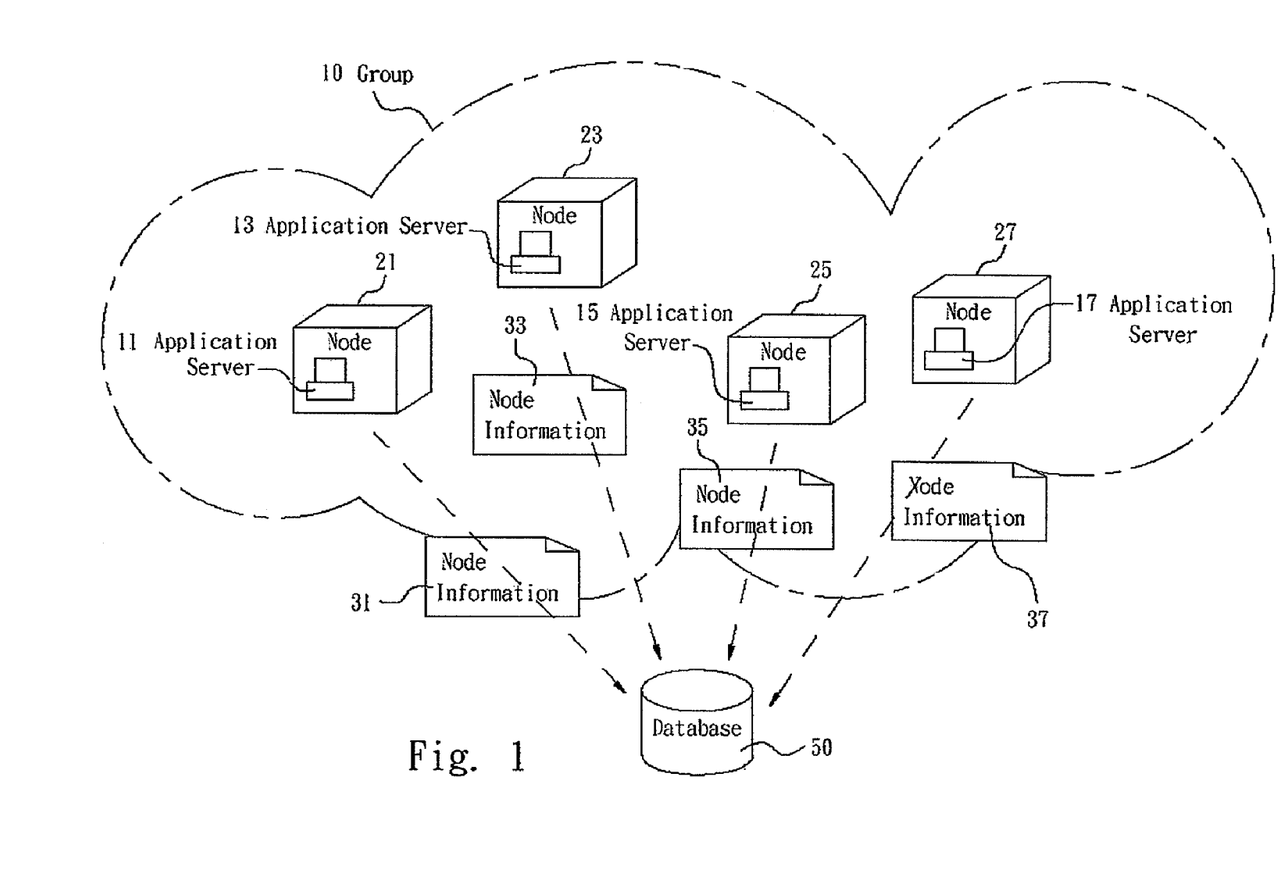
FIG. 1 is a schematic flow diagram showing a node-clustering step of APCS according to a preferred embodiment of the present invention.

Referring to FIG. 1, FIG. 1 is a schematic flow diagram showing a node-clustering step of APCS according to a preferred embodiment of the present invention. In a cluster environment, there are a plurality of nodes 21, 23, 25 and 27, and a database 50, wherein nodes 21, 23, 25 and 27 can be application servers 11, 13, 15 and 17. In the node-clustering step, a user first has to establish a name for a group 10, and then stores node information 31, 33, 35 and 37 of the nodes 21, 23, 25 and 27 respectively to the database 50. The node information includes a node ID and APCS service data.

(2) Step of Invoking and Detecting Applications

The step of invoking and detecting applications can be classified into two modes, wherein one mode is a step for invoking and detecting local applications, and the other mode is a step for invoking and detecting remote applications.

Figure 2:
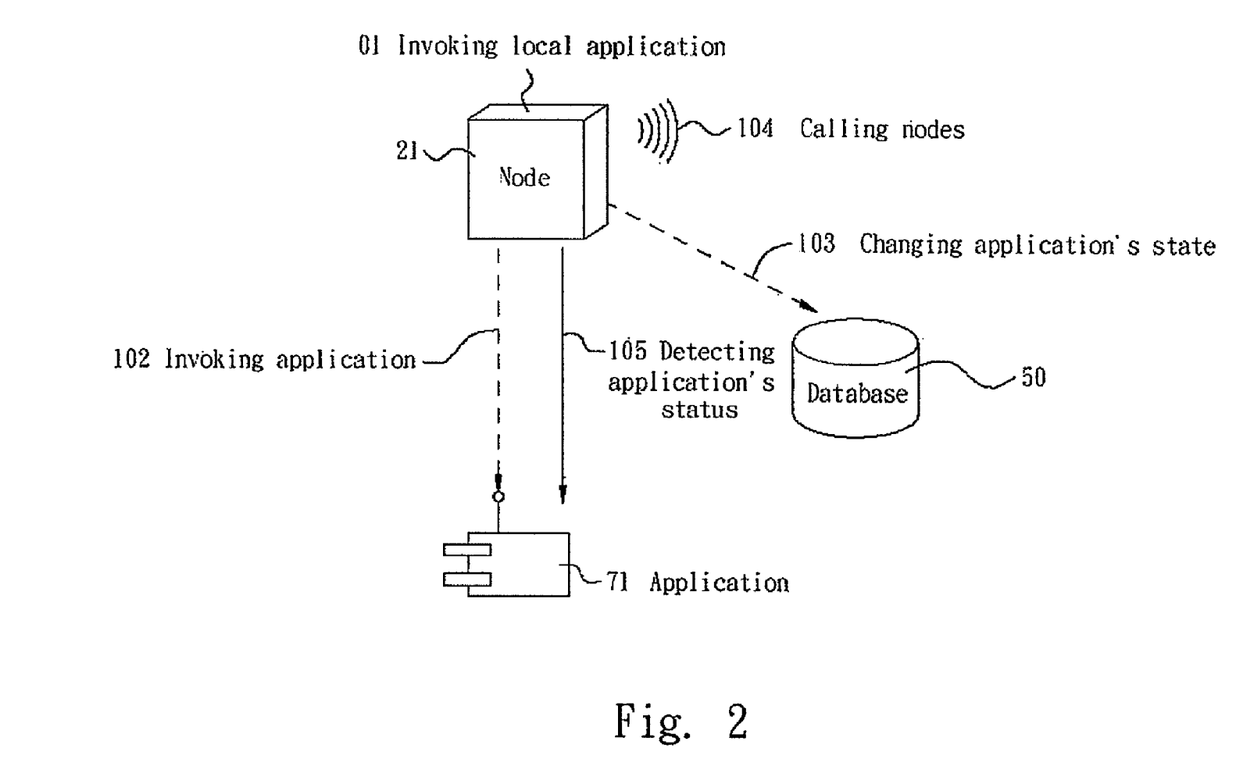
FIG. 2 is a schematic flow diagram showing a step of invoking and detecting local applications according to the preferred embodiment of the present invention.

Referring to FIG. 2, FIG. 2 is a schematic flow diagram showing a step of invoking and detecting local applications according to the preferred embodiment of the present invention. In the step of invoking and detecting local applications, the user start to invoke a local application via a user interface of the node 21 (step 101). Thereafter, the cluster service of the node 21 uses an application 71's name transmitted thereto and a method of calling OS API (Operation System Application Programming Interfaces) to invoke an application 71 (step 102). After the application 71 is successfully activated, the node 21 changes the execution state of the application 71 in the database 50 to "Up" (step 103). Then, the node 21 calls the rest of the activated nodes to change the execution state of the application 71 to "Up" (step 104). Thereafter, the node 21 starts detecting the status of the application 71 and generating a related report (step 105).

Figure 3:
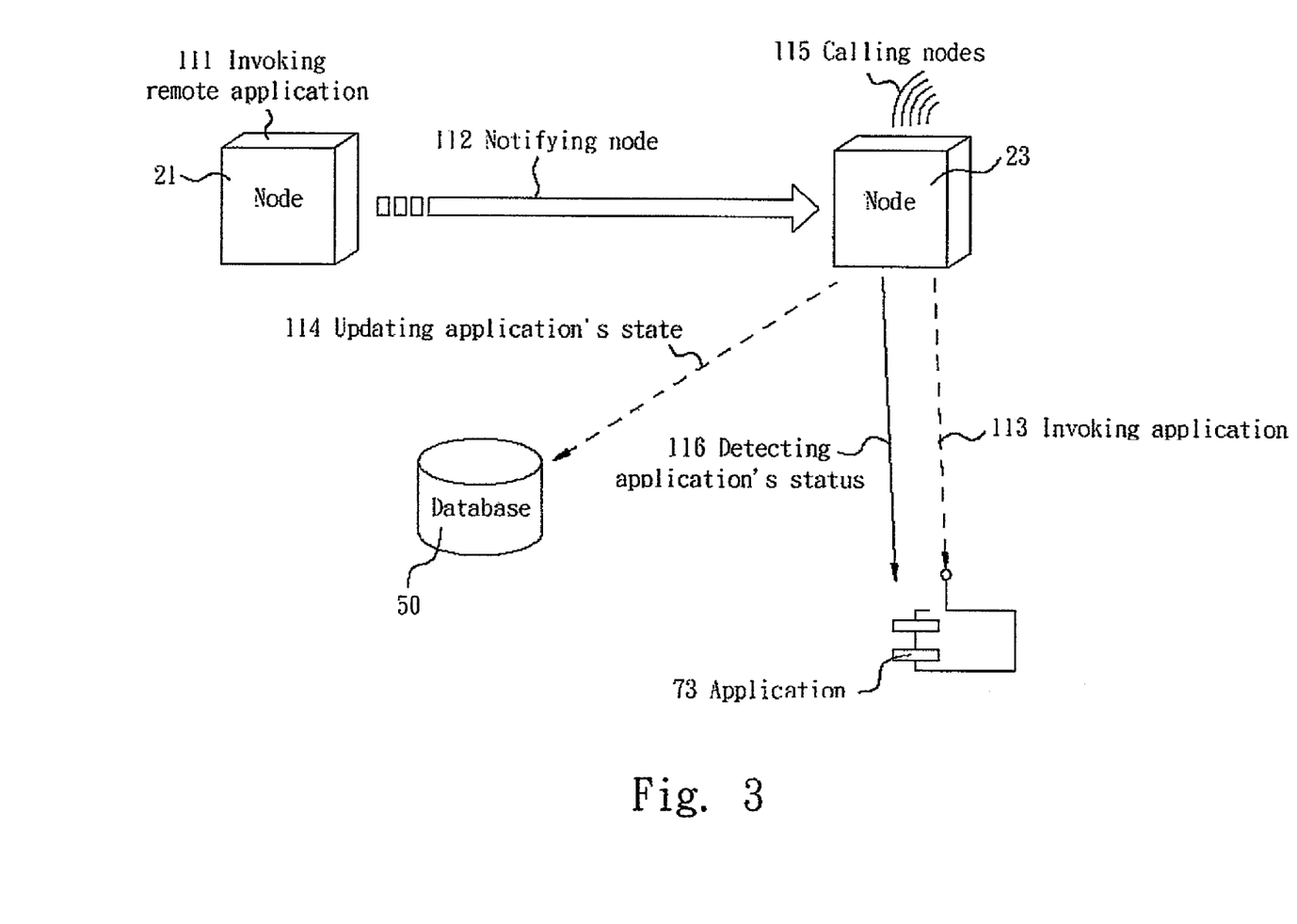
FIG. 3 is a schematic flow diagram showing a step of invoking and detecting remote applications according to the preferred embodiment of the present invention.

Referring to FIG. 3, FIG. 3 is a schematic flow diagram showing a step of invoking and detecting remote applications according to the preferred embodiment of the present invention. In the step of invoking and detecting remote applications, the user start to invoke a remote application (i.e. another node) in the cluster environment via a user interface of the node 21 (step 111). Thereafter, the node 23 desired to invoke its application is notified (step 112). The node 23 uses an application 73's name transmitted thereto and a method of calling OS API to invoke an application 73 (step 113), after receiving the notification of activating its application. After the application 73 is successfully activated, the node 23 updates the execution state of the application 73 in the database 50 to "Up" (step 114). Then, the node 23 calls the rest of the activated nodes to change the execution state of the application 73 to "Up" (step 115). Thereafter, the node 23 starts detecting the status of the application 73 and generating a related report (step 116).

(3) Application Fault-Recovery Step

Figure 4:
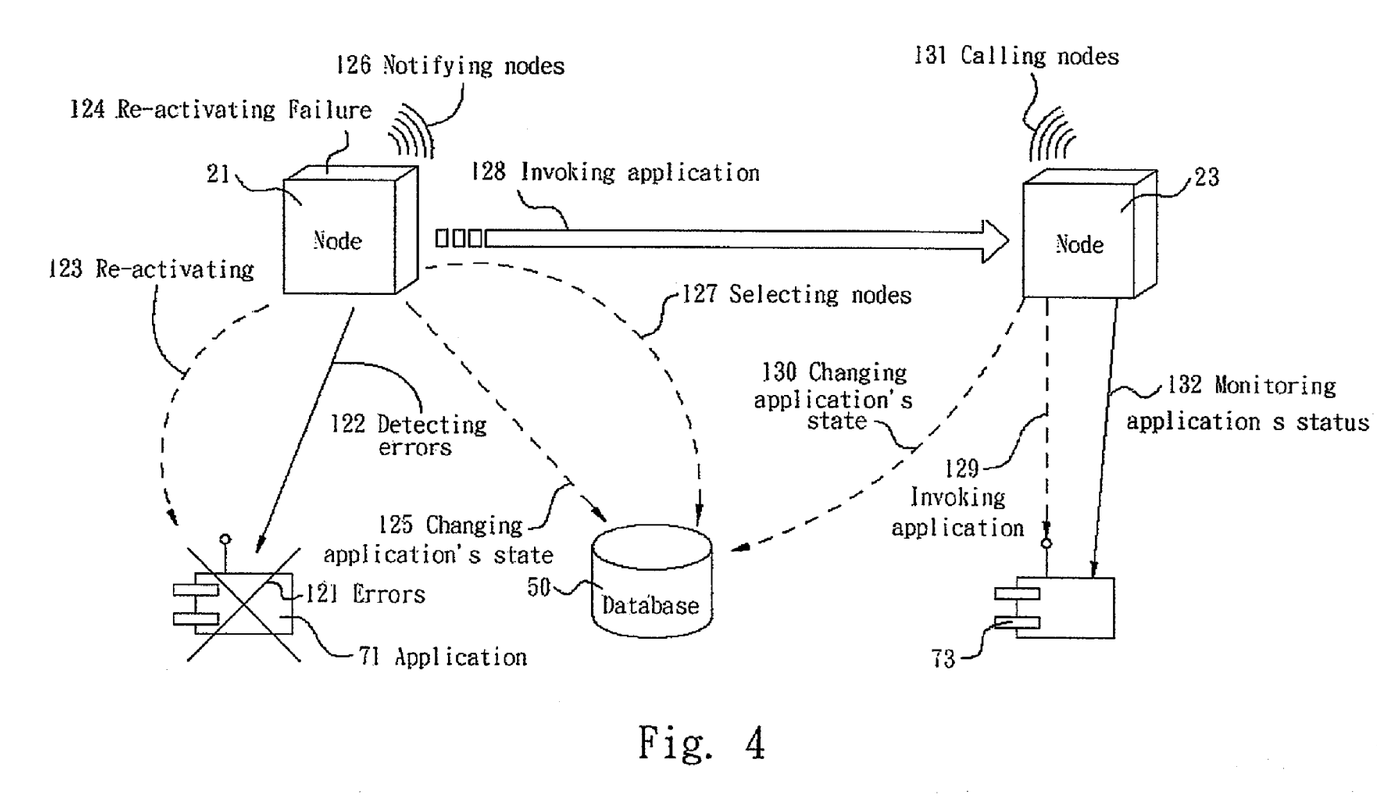
FIG. 4 is a schematic flow diagram showing an application fault-recovery step of APCS according to the preferred embodiment of the present invention.

Referring to FIG. 4, FIG. 4 is a schematic flow diagram showing a fault-recovery step of APCS according to the preferred embodiment of the present invention. In the application fault-recovery step, at first, errors occur for one certain application 71 of the node 21 (step 121). Thereafter, the node 21 has detected that the application 71 has execution errors (step 122). Thereafter, the node 21 tries to re-activate the faulty application 71 (step 123). After the node 21 has failed in re-activating the application 71 for three successive tries (step 124), the node 21 changes the state of the application 71 in the database 50 to "Failure" (step 125), and notifies the rest of the activated nodes in the cluster environment to change the state of the application 71 to "Failure" (step 126). Then, the node 21 retrieve data from the database 50 so as to select the activate nodes having the backup of the application 71 in the cluster environment (step 127), wherein at least one node with the smallest node ID except the node 21 is selected for continuously providing the service of the failed node 21. For example, the node 23 having the application 73 is selected, wherein the application 73 is the backup application of the application 71.

The node 21 notifies the node 23 to invoke the application 73 after selecting the node 23 (step 128). After receiving the notice for invoking the application 73, the node 23 uses the method of calling OS API to invoke an application 73 (step 129). After successful activation, the node 23 changes the execution state of the application 73 in the database 50 to "Up" (step 130). Thereafter, the node 23 calls the rest of activated nodes in the cluster environment to change the state of the application 73 to "Up" (step 131). Then, the node 23 starts monitoring the execution status of the application 73 and generated a report.

(4) Node-Detection Step

The node-detection step can be classified into two modes, wherein one mode is a master-node detection step, and the other mode is a slave-node detection step.

Figure 5:
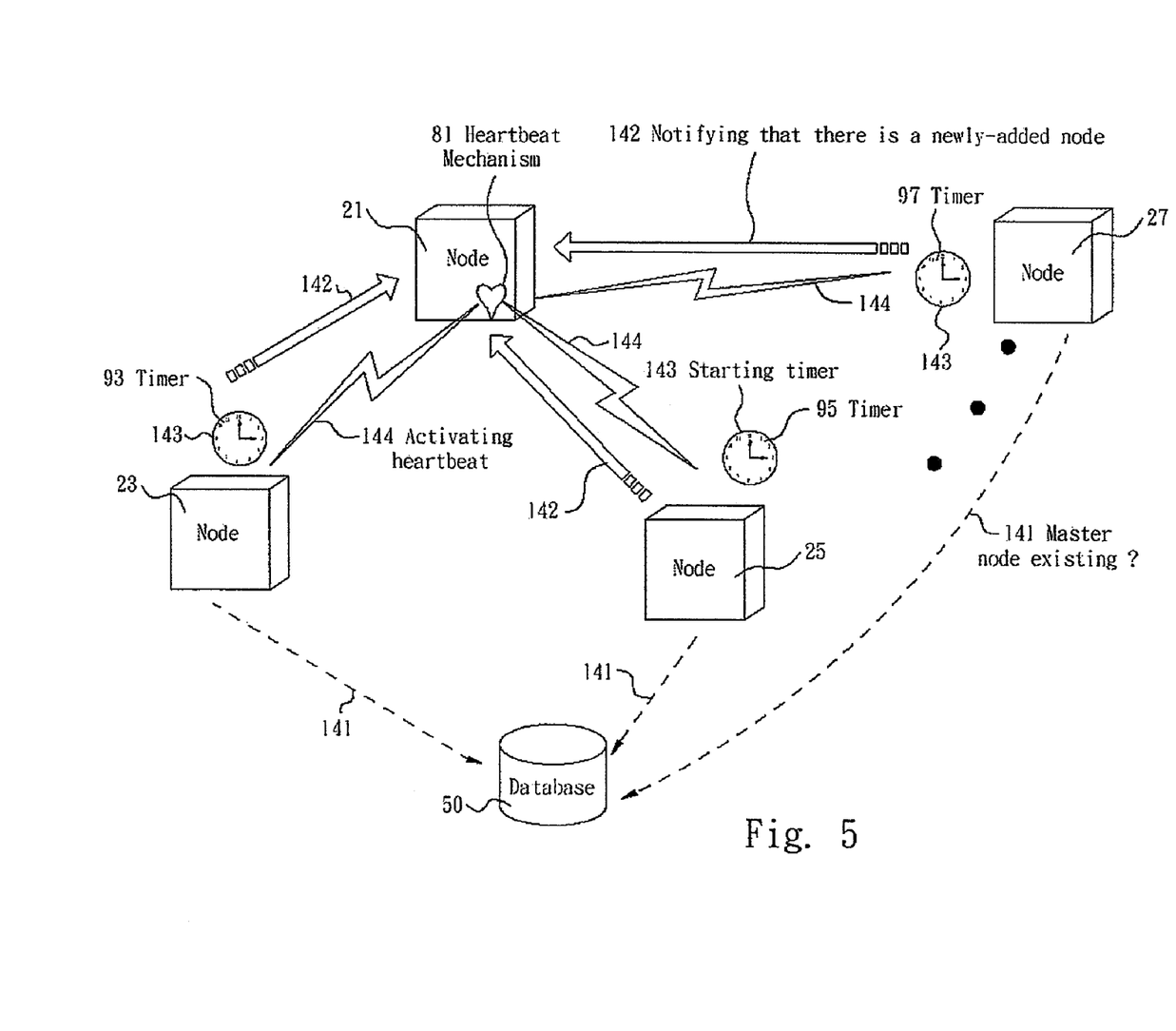
FIG. 5 is a schematic flow diagram showing a slave-node detection step of APCS according to the preferred embodiment of the present invention.

Referring to FIG. 5, FIG. 5 is a schematic flow diagram showing a slave-node detection step of APCS according to the preferred embodiment of the present invention. In the slave-node detection step, at first, when a certain node is activated, this node will retrieve data in the database 50 to determine if there exists the master node (for example, the node 21) in the cluster environment (step 141). If existing, this node will become a slave node (such as the node 23, 25 or 27). Generally, the first node activated in the cluster environment becomes the master node. Thereafter, the newly activated node 23, 25 or 27 notifies the master node 21 that there is a newly-added node 23, 25 or 27 in the cluster environment (step 142). Thereafter, the slave nodes 23, 25 and 27 start timers 93, 95 and 97 respectively for waiting for the master node 21 to send a master heartbeat (step 143), wherein after receiving the notification of step 142 from the salve nodes 23, 25 and 27, the master node 21 activates a heartbeat mechanism 81 for sending the master heartbeat periodically to each of the slave nodes, and waits for an acknowledgement response from each of the slave nodes 23, 25 and 27 (step 144). After receiving the master heartbeat, the slave nodes 23, 25 and 27 reset the timers 93, 95 and 97 respectively.

Figure 6:
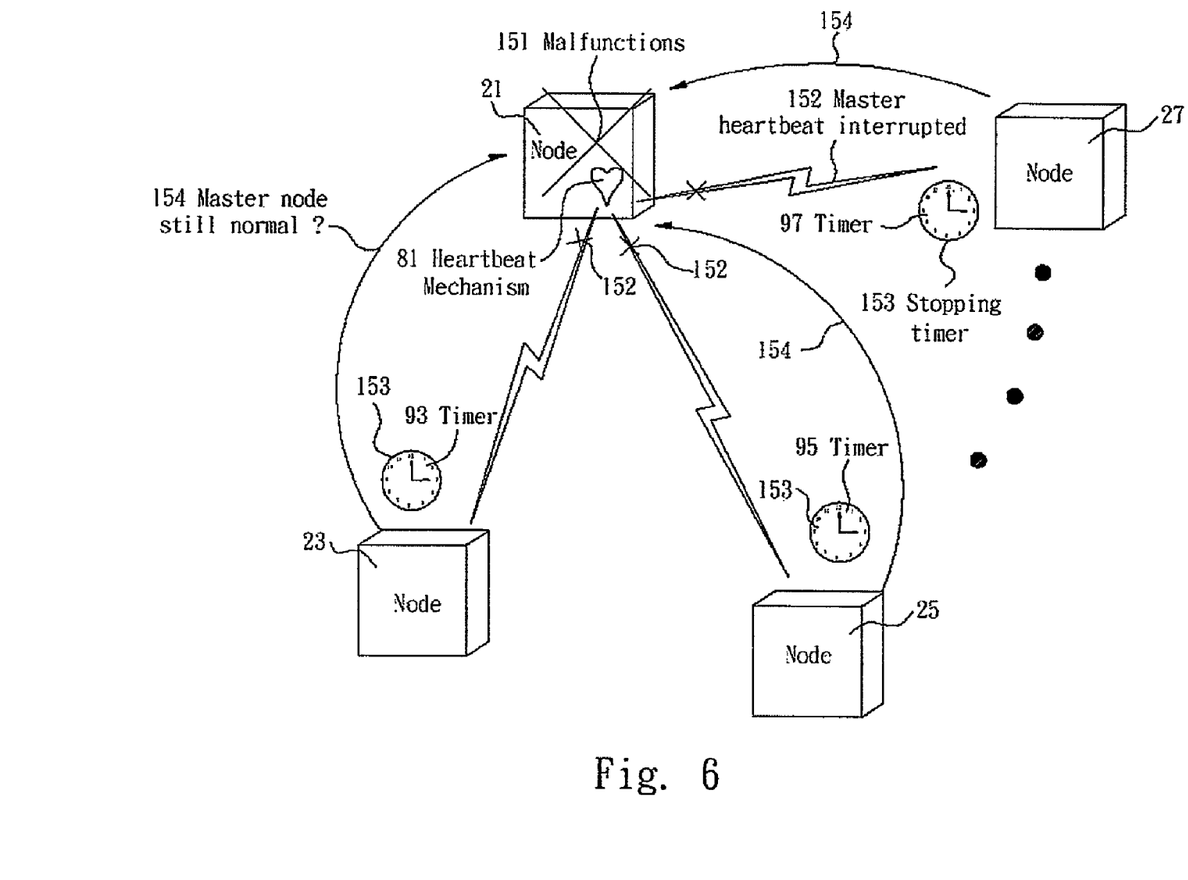
FIG. 6 is a schematic flow diagram showing a master-node detection step of APCS according to the preferred embodiment of the present invention.

Referring to FIG. 6, FIG. 6 is a schematic flow diagram showing a master-node detection step of APCS according to the preferred embodiment of the present invention. In the master-node detection step, when the master node 21 has malfunctions (step 151), the malfunctions interrupt the sending of the master heartbeat (step 152). While the slave nodes 23, 25 and 27 do not receive the heartbeats from the master node 21 for a period time (such as the time for sending three successive heartbeats), the slave nodes' timers 93, 95 and 97 used for waiting for heartbeats are stopped ("Timeout") (step 153). Meanwhile, the slave nodes 23, 25 or 27 stop the operation of the timer 93, 95 and 97 used for waiting for receiving the master heartbeats. Thereafter, the slave nodes 23, 25 and 27 start detecting if the master node 21 is still in normal operation (step 154).

(5) Node Replacement Step

The node replacement step (used while the node has errors in application execution) is classified into two modes, wherein one mode is a slave-node replacement step, and the other mode is a master-node replacement step.

Figure 7:
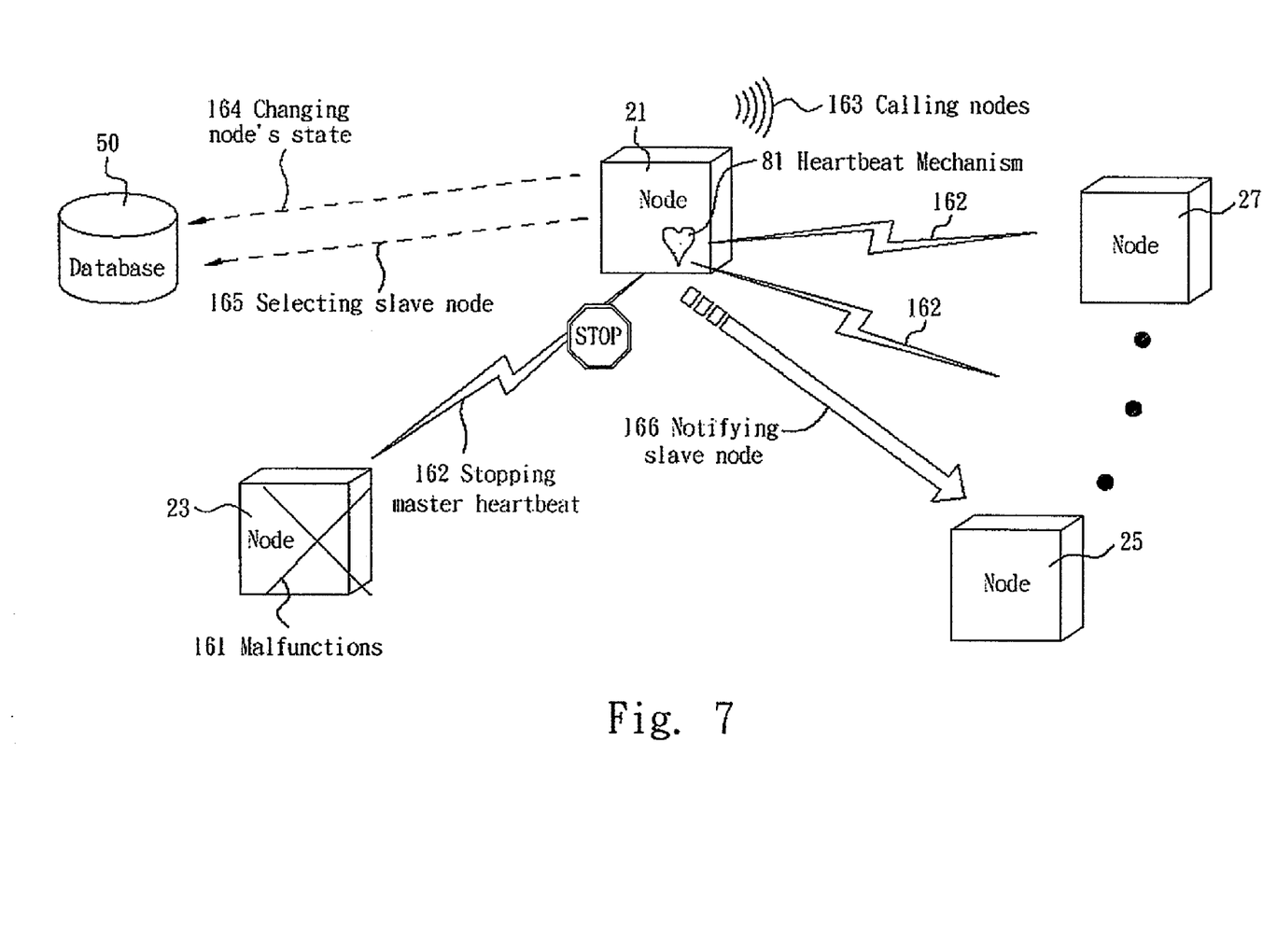
FIG. 7 is a schematic flow diagram showing a slave-node replacement step of APCS according to the preferred embodiment of the present invention.

FIG. 7 is a schematic flow diagram showing a slave-node replacement step of APCS according to the preferred embodiment of the present invention. In the slave-node replacement step, when some node (for example, the node 23) in the cluster environment has malfunctions (step 161) and the master node 21 has detected and learned via the heartbeat mechanism 81 that the slave node 23 has already had no response and failed to reply for three successive tries of detection, the master node 21 stops sending the master heartbeat to the slave node 23 (step 162). Meanwhile, the master node 21 notifies the rest of the activated slave nodes 25 and 27 to change the execution state of the slave node 23 to "Failure" (step 163), and change the execution state of the slave node 23 the database 50 to "Failure" (step 164). Thereafter, the master node 21 retrieves data from the database 50 to select at least one slave node (step 165) having the same application executed in the node 23 before failure, wherein the node with the smallest node ID is first to be selected for providing continuous services. Then, after selecting aforementioned slave node (for example, the node 25), the master node 21 notifies the slave node 25 to invoke its application (step 166).

Figure 8A:
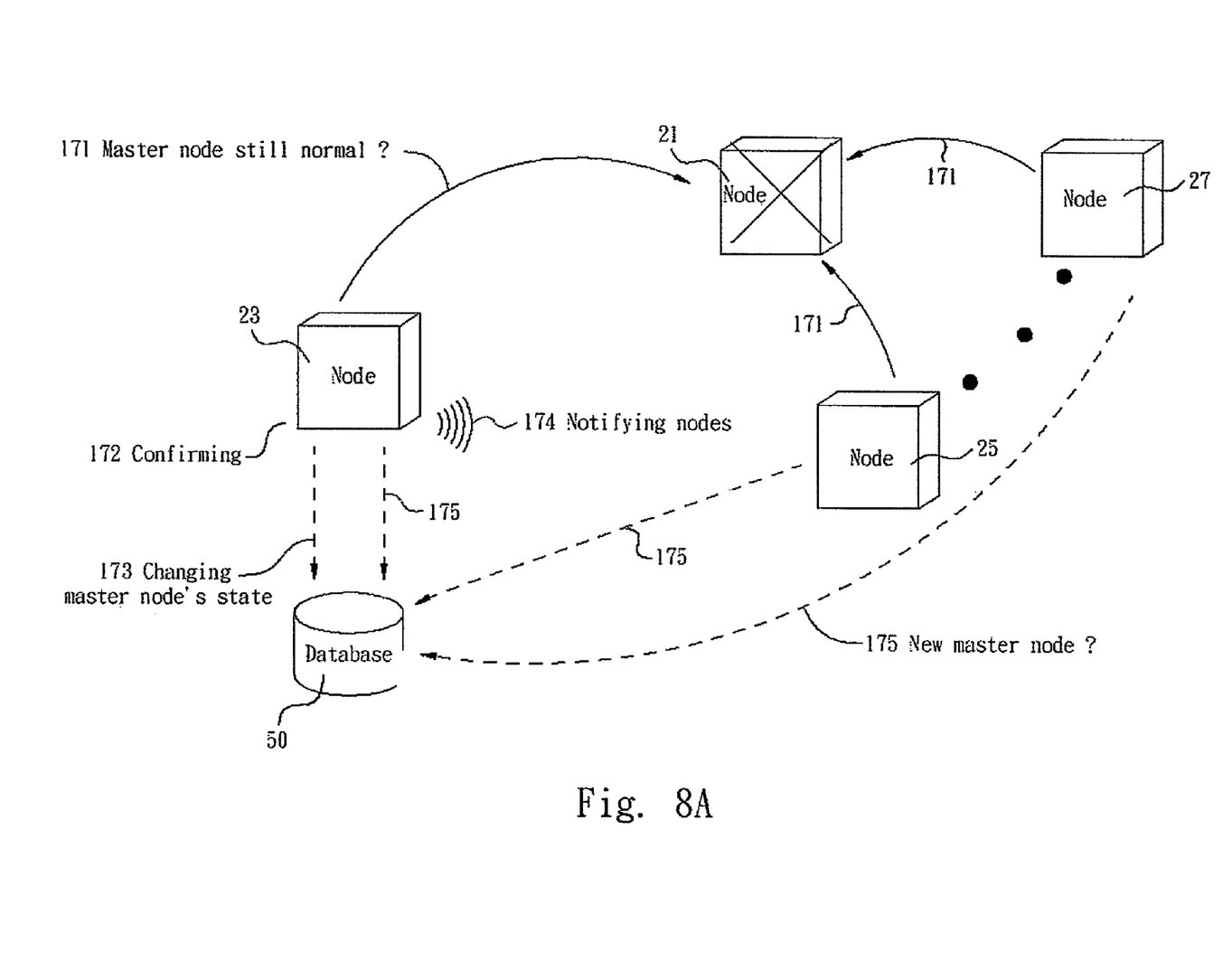
FIG. 8A and FIG. 8B are schematic flow diagrams showing a master-node replacement step of APCS according to the preferred embodiment of the present invention.
Figure 8B:
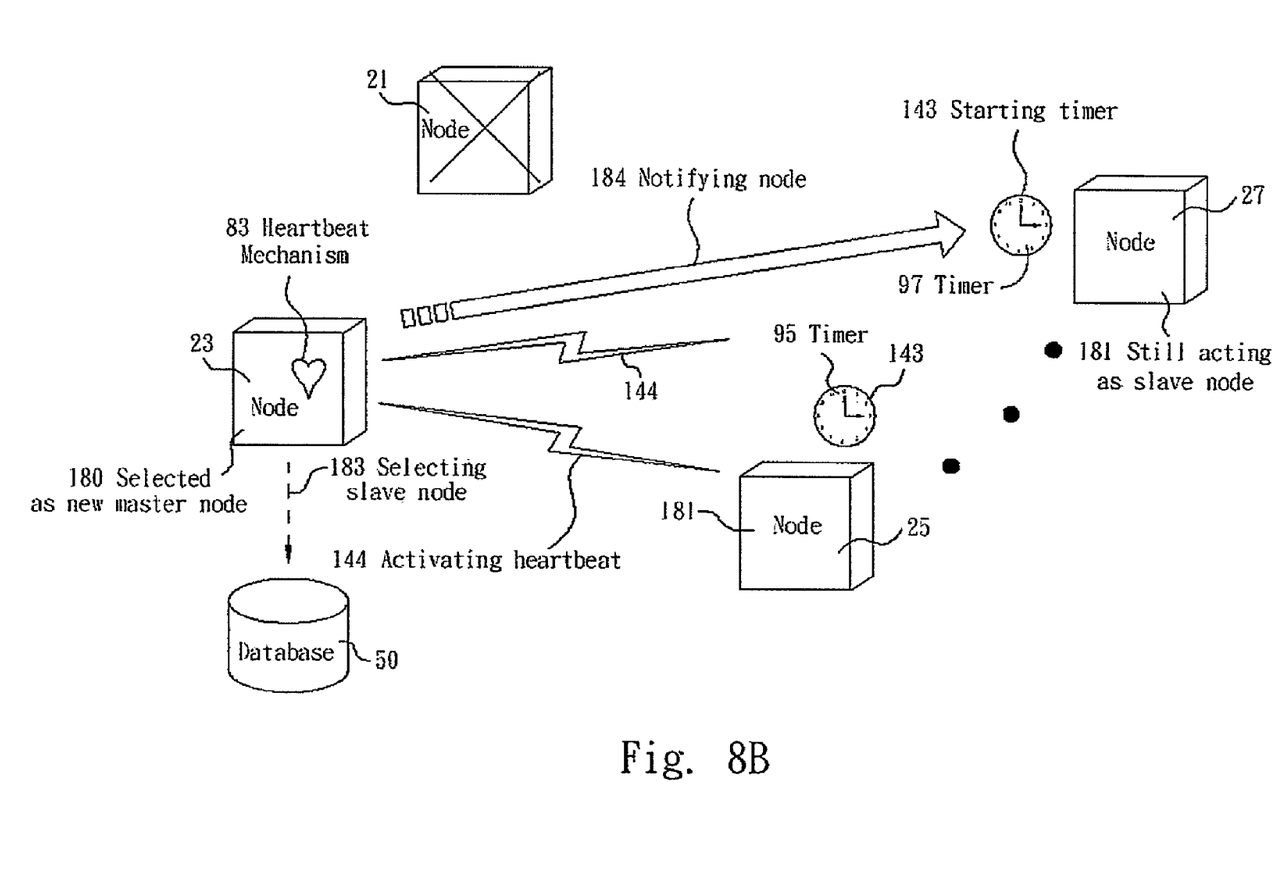

Referring to FIG. 8A and FIG. 8B, FIG. 8A and FIG. 8B are schematic flow diagrams showing a master-node replacement step of APCS according to the preferred embodiment of the present invention. Such as shown in FIG. 8A, in the master-node replacement step, when the master node 21 has malfunctions, the slave nodes 23, 25 and 27 in the cluster environment start detecting if the master node 21 is still in normal operation (step 171). If some slave node (for example, the node 23) has learned that the master node 21 has had no response for three successive tries, it is confirmed that the master node 21 is faulty (step 172). Thereafter, the slave node 23 changes the execution state of the master node in the database 50 to "Failure" (step 173), and notifies the rest of activated slave nodes in the cluster environment to stop detecting the master node 21 and start to select a new master node by performing a reconfiguring step (step 174). The salve nodes 23, 25 and 27 receiving the notification of reconfiguring will retrieve data in the database 50 to determine if the node itself should be the new master node (step 175)

Such as shown in FIG. 8B, after receiving the notification of reconfiguring and determining if the node itself should become the new master, the earliest node activated in the cluster environment (for example, the slave node 23) will be selected as the new master node (hereinafter referred as the new master node 23) (step 180), and the rest of the non-master nodes still act as the slave nodes (such as the slave nodes 25 and 27) (step 181). Thereafter, the slave nodes 25 and 27 start their timers 95 and 97 respectively (step 143) for waiting the new master node 23 to send heartbeats. Meanwhile, the new master node 23 activates a new heartbeat mechanism 83 to send periodic heartbeats respectively to the slave nodes 25 and 27 (step 144), and waits for the slave nodes 25 and 27 to return acknowledgement responses. Then, the new master 23 retrieves data from the database 50 to select at least one slave node (step 183) having the same application executed in the master node 21 before failure, wherein the node with the smallest node ID (for example, the node 27) is first to be selected for providing continuous services. Then, the master node 23 notifies the slave node 27 to invoke its application (step 184).

It is worthy to be noted that the present invention has generic applicability and is suitable for use in various high-tech electronic industries, such as semiconductor and TFT-LCD industries, etc. As long as the applications (programs) to be managed are linked with network, the present invention is applicable. When the present invention is applied in a MES, the availability of the MES can be greatly enhanced. When the module services of some node in a cluster environment have errors, the other node can be notified promptly to replace the failed module services, thereby increasing the availability and stability for the entire system.

Hereinafter, a MES suitable for use in semiconductor and TFT-LCD industries are used as an illustrative example for explaining the application of the present invention.

Figure 9:
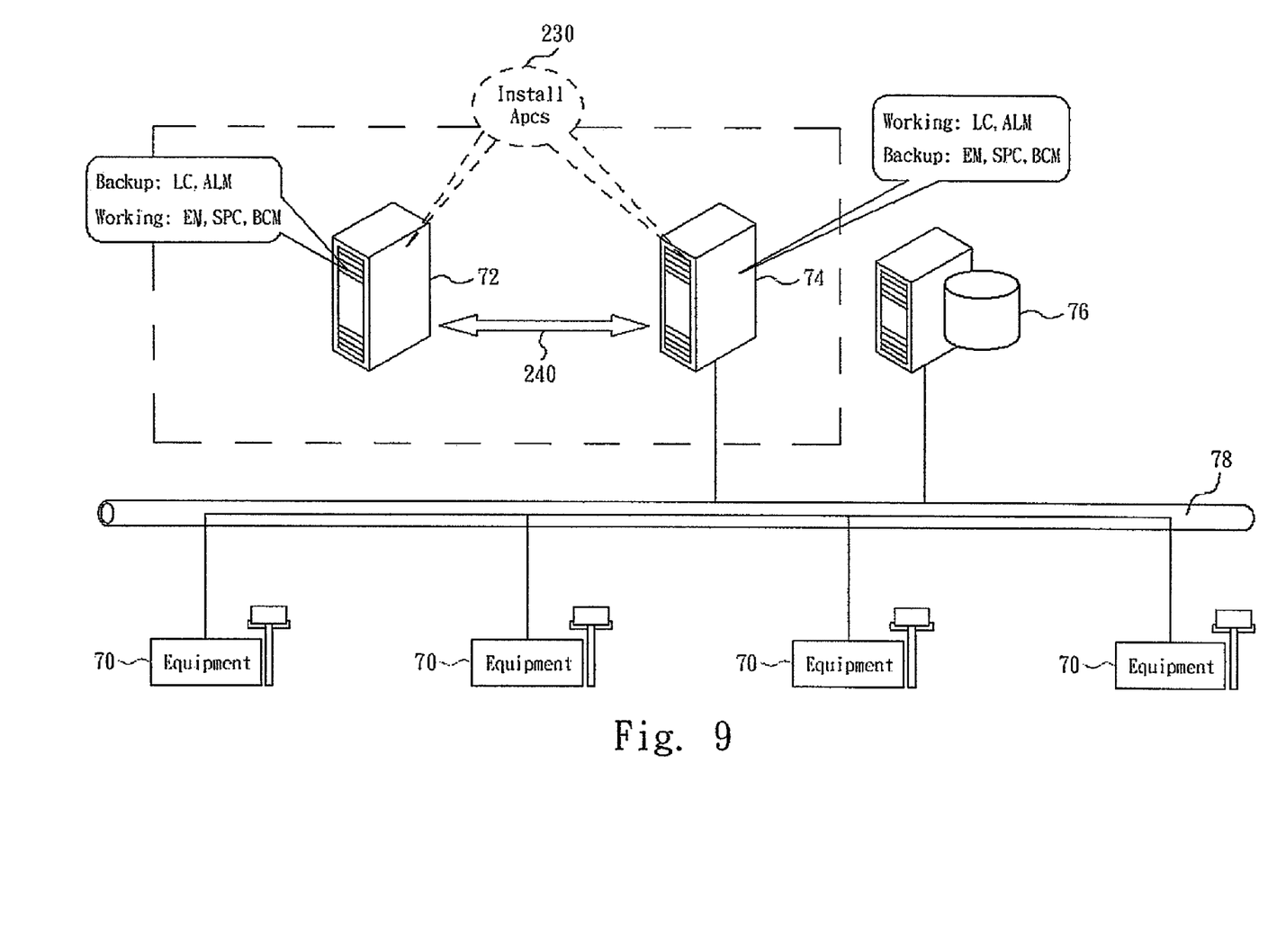
FIG. 9 is a schematic diagram showing hardware and software implementation in a MES employing the method of the present invention.

Referring to FIG. 9, FIG. 9 is a schematic diagram showing hardware and software implementation in a MES employing the method of the present invention, wherein the MES includes five major application modules: an equipment manager (EM), a lot control (LC), a statistics process control (SPC), a bar code management (BCM) and an alarm management (ALM), and those five modules are respectively implemented on application servers 72 and 74, wherein CORBA communication infrastructure 78 are used for transmitting information and management a plurality of equipments 70. In normal operation, the application server 72 merely activates EM, SPC and BCM modules, and uses LC and ALM modules as backup; and the application server 74 merely activates LC and ALM modules, and uses EM, SPC and BCM modules as backup. Step 230 is performed for installing the APCS of the present invention respectively to the application servers 72 and 74 for providing fault-tolerant APCS.

The following explanation is stated in accordance with the aforementioned five major steps of the APCS of the present invention.

(1) Node-Clustering Step

The application servers 72 and 74 are respectively added to a cluster environment, and thus become two nodes in the cluster environment.

(2) Step of Invoking and Detecting Applications

With respect to the activated modules EM, SPC and BCM of the application server 72, the APCS of the application server 72 changes the execution status of these applications (modules) to "Up" (working), and starts monitoring the execution status of them.

As to the activated modules LC and ALM of the application server 74, the APCS of the application server 74 changes the execution status of these applications (modules) to "Up" (working), and starts monitoring the execution status of them.

(3) Application Fault-Recovery Step

For example, the EM module of the application server 72 has execution errors. The APCS of the application server 72 will detect this situation and try to re-activate the EM module. If the APCS of the application server 72 fails to activate the EM module for three successive tries, the execution state of the EM module will be changed to "Failure". Thereafter, the APCS of the application server 72 retrieve data in a database 76 to determine and find out that the application server 74 is also one of the nodes in the cluster environment, so that the application server 74 is notified to activate its backup EM module.

After receiving the notification of activation, the application server 74 activates the backup EM module, and changes the execution state of this backup EM module to "Up" for continuously providing the service of the failed EM module.

(4) Node-Detection Step

In the save-node detection step, the first node activated in the cluster environment is the master node. Therefore, suppose the APCS of the application server 72 is first activated, and the APCS of the application server 74 follows, the application server 72 will then be considered as the master node, and the application server 74 as the slave node. After the application server 74 is activated, a timer is established therein for waiting for the heartbeat sent from the APCS of the application server 72. After learning that the APCS of the application server 74 is activated, the APCS of the application server 72 starts sending heartbeats to the APCS of the application server 74 and waits for an acknowledgement response returned from the application server 74. The aforementioned step is used for detecting if the application server 74 is faulty due to breakdown.

In the master-node detection step, if the application server 72 is down due to malfunctions, the heartbeats sent by the APCS of the application server 72 will be stopped, and thus the timer of the APCS of the application server 74 used for waiting the heartbeats will be stopped ("Timeout") after the APCS of the application server 74 has not received the heartbeats for a period of time. Meanwhile, the application server 74 starts to detect if the application server 72 is still in operation.

(5) Node-Replacement Step

In the slave-node replacement step, if the application server 74 is down due to malfunctions, the application server 72 will detect and learn via the heartbeat mechanism that the application 74 has no response. If no response is returned for the heartbeats sent by the application server 72 for three successive tries, the application server 72 will stop sending heartbeats to the application server 74. Thereafter, the application server 72 changes in the database 76 the execution state of the application server 74 to "Failure". Thereafter, the application server 72 activates its backup modules LC and ALM to provide continuous services.

In the master-node replacement step, if the application server 72 is down due to malfunctions, the application server 74's timer will be stopped ("Timeout") after the application server 74 has not received the master heartbeat for a period of time. Meanwhile, the application server 74 starts to detect if the application server 72 is still in operation. If the application server 74 has learned that the application server 72 has had no response for three successive tries, it is confirmed that the application server 72 is faulty. Thereafter, the application server 74 changes the execution state of the application server 72 in the database 76 to "Failure", and the application server 74 become a new master node. Then, the application server 74 activates all of its applications modules EM, SPC, BCM, LC and ALM for continuously providing services.

Therefore, it is known from the above description that the combination of the APCS of the present invention and the MES can enhance the stability of the system services of the MES, thus achieving the objective of near-zero-downtime services.

From the aforementioned embodiment of the present invention, it can be known that the method for providing fault-tolerant APCS can simplify the detection process and achieve fault-tolerant efficiency; has generic applicability and is suitable for use in various high-tech industries, thereby enhancing the availability and reliability of such as MES; and can reduce network burden by sending heartbeats via one single healthy master node.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for providing fault-tolerant application cluster service (APCS), suitable for use in a group in a cluster environment, wherein there are a plurality of nodes and a database independent of said nodes in said cluster environment, and said nodes belong to said group and a master node and a plurality of slave nodes are classified from said nodes, said method comprising:

performing a node-clustering step for storing node information for each of said nodes into said database, wherein said node information includes a node ID and APCS service data;

performing a slave-node detection step, wherein said slave-node detection step comprising:

a first node of said nodes retrieving data in said database to determine if there exists said master node in said cluster environment when said first node is activated, thereby generating a first result;

assigning the node first activated among said nodes as said master node when said first result is no;

said first node notifying said master node that said first node is added to said cluster environment as one of said slave nodes;

said master node activating a heartbeat mechanism for sending a master heartbeat periodically to each of said slave nodes, and waiting for an acknowledgement response from each of said slave nodes; and each of said slave nodes starting a timer for waiting for said master node to send said master heartbeat, wherein each of said slave nodes resets said timer after receiving said master heartbeat; and performing a master-node detection step, wherein, when the sending of said master heartbeat is interrupted due to said master node's errors, said timer will be stopped ("Timeout") after each of said slave nodes has not received said master heartbeat for a period of time, and thus each of said slave nodes stops waiting for receiving said master heartbeat, and starts detecting if said master node is still in normal operation.

2. The method of claim 1, wherein, when a first slave node of said slave nodes in said cluster environment has malfunctions, a slave-node replacement step is performed, said slave-node replacement step comprising:

said master node detecting said first slave node already having no acknowledgement response via said heartbeat mechanism;

said master node stopping sending said master heartbeat to said first slave node, and notifying said database and the rest of said slave nodes except said first slave node to change the execution state of said first slave node to "Failure";

said master node retrieving data from said database to select at least one second slave node having an application originally executed in said first slave node before its failure;

said master node notifying said second slave node to invoke said application.

3. The method of claim 2, wherein, when said first slave node fails to generate said acknowledgement response for three successive tries, said first slave node is considered as breakdown.

4. The method of claim 1, wherein, when one of said slave nodes has detected that said master node has malfunctions, a master-node replacement step is performed, said master-node replacement step comprising:

said one of said slave nodes changing the execution state of said master node in said database to "Failure";

said one of said slave nodes notifying the rest of said slave nodes to stop detecting said master node;

each of said slave nodes retrieving data in said database to determine if it should be a new master node, wherein the node first activated among said salve nodes become said new master node;

said new master node re-activating a new heartbeat mechanism for sending a new master heartbeat to the rest of said slave nodes which are not said new master node, and waiting for a new acknowledgement response therefrom;

said new master node retrieving data from said database to select at least one third slave node having the same application originally executed in said master node before its failure and said new master node notifying said third slave node to invoke said application.

5. The method of claim 4, wherein said one of said slave nodes starts making an inquiry to detect if said master node has malfunctions after not having received said heartbeat sent from said master node for three successive occasions, and said master node is considered as breakdown after making no response to said inquiry for three successive tries.

6. The method of claim 1, further comprising:

performing a step of invoking and detecting applications, said step of invoking and detecting applications comprising:

activating a first application of said first node of said nodes via a first cluster service of said first node;

notifying said first node and said database to update the execution state of said first application to "UP" after said first application is activated; and said first cluster service of said first node monitoring the execution status of said first application; and performing an application fault-recovery step, said application fault-recovery step comprising:

changing the execution state of said first application to "DOWN" in said first node and said database, when said first node has detected that said first application has execution errors, and then selecting a second node having a second application from said nodes, wherein the function of said second application is the same as the function of said first application;

notifying said second node to invoke said second application, changing the execution state of said second application to "UP" in said second node and said database, after said second application is activated successfully; and monitoring the execution status of said second application.

7. The method of claim 1, wherein said node-clustering step further comprises:

adding each of said nodes to said group.

8. A method for providing fault-tolerant application cluster service (APCS), suitable for use in a group in a cluster environment, wherein there are a plurality of nodes and a database independent of said nodes in said cluster environment, and said nodes belong to said group and a master node and a plurality of slave nodes are classified from said nodes, said method comprising:

performing a node-clustering step for storing node information for each of said nodes into said database, wherein said node information includes a node ID and APOS service data;

performing a step of invoking and detecting applications for activating a first application of a first node of said nodes via a first cluster service of said first node, wherein said first node requires said nodes and said database to update the execution state of said first application to "UP" after said first application is activated, and said first cluster service also monitors the execution status of said first application;

performing an application fault-recovery step, said application fault-recovery step comprising:

said first node changing the execution state of said first application in said first node and said database to "DOWN", when said first node detects that said first application has execution errors, and then selecting a second node having a second application from said nodes, wherein the function of said second application is the same as the function of said first application;

said first node notifying said second node to invoke said second application, said second node changing the execution state of said second application in said second node and said database to "UP", after said second application is activated successfully; and said second node monitoring the execution status of said second application;

performing a slave-node detection step, wherein said slave-node detection step comprising:

said first node retrieving data in said database to determine if there exists said master node in said cluster environment when said first node is activated, thereby generating a first result;

assigning the node first activated among said nodes as said master node when said first result is no;

said first node notifying said master node that said first node is added to said cluster environment as one of said slave nodes when said first result is yes;

said master node activating a heartbeat mechanism for sending a master heartbeat periodically to each of said slave nodes, and waiting for a acknowledgement response from each of said slave nodes; and each of said slave nodes starting a timer for waiting for said master node to send said master heartbeat, wherein each of said slave nodes resets said timer after receiving said master heartbeat; and performing a master-node detection step, wherein, when the sending of said master heartbeat is interrupted due to said master node's errors, said timer will be stopped ("Timeout") after each of said slave nodes has not received said master heartbeat for a period of time, and thus each of said slave nodes stops waiting for receiving said master heartbeat, and starts detecting if said master node is still in normal operation;

performing a slave-node replacement step, said slave-node replacement step comprising:

said master node detecting a first slave node already having no acknowledgement response via said heartbeat mechanism;

said master node stopping sending said master heartbeat to said first slave node, and notifying said database and the rest of said slave nodes except said first node to change the execution state of said first slave node to "Failure";

said master node retrieving data from said database to select at least one first candidate node having a first application originally executed in said first node before its failure;

said mater node selecting a second node from said at least one first candidate node, wherein said second node has the smallest node ID among said at least one first candidate node; and said mater node notifying said second node to invoke said first application; and performing a master-node replacement, said master-node replacement step comprising:

one of said slave nodes changing the execution state of said master node in said database to "Failure", wherein said one of said slave nodes makes an inquiry to detect if said master node has malfunctions after not having received said heartbeat sent from said master node for three successive occasions, and said master node is considered as breakdown after making no response to said inquiry for three successive tries;

said one of said slave nodes notifying each of said slave nodes to stop detecting said master node;

each of said slave nodes retrieving data in said database to determine if it should be a new master node, wherein the node first activated among said salve nodes become said new master node;

said new master node re-activating a new heartbeat mechanism for sending a new master heartbeat to the rest of said slave nodes which are not said new master node, and waiting for a new acknowledgement response therefrom;

said new master node retrieving data from said database to select at least one second candidate node having a second application originally executed in said master node before its failure;

said new mater node selecting a third node from said at least one second candidate slave node, wherein said third node has the smallest node ID among said at least one second candidate node; and said new mater node notifying said third node to invoke said second application.

9. The method of claim 8, wherein, when said first slave node fails to generate said acknowledgement response for three successive tries, said first slave node is considered as breakdown.

10. The method of claim 8, wherein said node-clustering step further comprises:

adding each of said nodes to said group.

* * * * *